US011440363B2

(12) United States Patent
Stieglitz et al.

(10) Patent No.: US 11,440,363 B2
(45) Date of Patent: Sep. 13, 2022

(54) THREE-POINT SUSPENSION LINK AND PRODUCTION METHOD FOR A THREE-POINT SUSPENSION LINK

(71) Applicant: ZF Friedrichshafen AG, Friedrichshafen (DE)

(72) Inventors: Andre Stieglitz, Osnabrück (DE); Ingolf Müller, Minfeld (DE); Philipp Bauer, Eriskirch (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 155 days.

(21) Appl. No.: 16/635,381

(22) PCT Filed: Jul. 16, 2018

(86) PCT No.: PCT/EP2018/069188
§ 371 (c)(1),
(2) Date: Jan. 30, 2020

(87) PCT Pub. No.: WO2019/025164
PCT Pub. Date: Feb. 7, 2019

(65) Prior Publication Data
US 2020/0180376 A1 Jun. 11, 2020

(30) Foreign Application Priority Data
Aug. 4, 2017 (DE) ...................... 10 2017 213 563.8

(51) Int. Cl.
*B60G 7/00* (2006.01)
*B29C 45/14* (2006.01)
(Continued)

(52) U.S. Cl.
CPC .............. *B60G 7/001* (2013.01); *B29C 45/14* (2013.01); *B29C 45/14631* (2013.01);
(Continued)

(58) Field of Classification Search
CPC ................ B60G 7/001; B60G 2206/10; B60G 2206/7101; B60G 2206/7102;
(Continued)

(56) References Cited

U.S. PATENT DOCUMENTS

| 4,650,620 A | 3/1987 | Owen et al. |
| 10,350,951 B2 | 7/2019 | Meyer et al. |

(Continued)

FOREIGN PATENT DOCUMENTS

| DE | 10 2005 027173 | 12/2006 |
| DE | 10 2014 214 827 | 2/2016 |

(Continued)

OTHER PUBLICATIONS

Description Translation for JP H10109511 from Espacenet (Year: 1998).*

(Continued)

*Primary Examiner* — Jonathan Ng
*Assistant Examiner* — Daniel M. Keck
(74) *Attorney, Agent, or Firm* — Cozen O'Connor

(57) ABSTRACT

A three-point suspension link for a chassis of a vehicle comprises two load-introducing elements, a central load-introducing element, two core profiles and a supporting winding. The three-point suspension link has two arms and a central bearing area. Each arm is connected to the central bearing area. Each arm has one of the load-introducing elements which is arranged at an end of the corresponding arm opposite the central bearing area. Each arm has a core profile which is spatially arranged between the load-introducing element and the central load-introducing element. The supporting winding surrounds the core profiles and the central load-introducing element in a subarea and is operatively connected to the core profiles, the load-introducing elements and the central load-introducing element.

13 Claims, 3 Drawing Sheets

(51) Int. Cl.
  *B29K 105/04* (2006.01)
  *B29K 705/02* (2006.01)
  *B29L 31/30* (2006.01)

(52) U.S. Cl.
  CPC ...... *B29K 2105/04* (2013.01); *B29K 2705/02* (2013.01); *B29L 2031/30* (2013.01); *B60G 2206/124* (2013.01); *B60G 2206/7101* (2013.01); *B60G 2206/7102* (2013.01); *B60G 2206/821* (2013.01)

(58) Field of Classification Search
  CPC .... B60G 2206/821; B60G 2206/82092; B29C 45/14; B29C 45/14631; B29C 45/0005; B29K 2105/04; B29K 2705/02; B20G 2206/124
  See application file for complete search history.

(56) References Cited

U.S. PATENT DOCUMENTS

| | | | | |
|---|---|---|---|---|
| 2005/0044984 A1* | 3/2005 | Jones | ........................ | E04C 3/29 74/579 R |
| 2014/0210177 A1* | 7/2014 | Dicke | .................... | B60G 7/001 280/124.134 |
| 2019/0061452 A1* | 2/2019 | Lee | ........................ | B29C 45/14 |
| 2021/0094628 A1* | 4/2021 | Ichikawa | .............. | F16F 1/3842 |

FOREIGN PATENT DOCUMENTS

| | | |
|---|---|---|
| DE | 10 2015 215077 | 2/2017 |
| DE | 10 2015 218026 | 3/2017 |
| DE | 10 2015 222 297 | 8/2017 |
| DE | 10 2016 211212 | 12/2017 |
| DE | 10 2016 211213 | 12/2017 |
| JP | H10 109511 | 4/1998 |
| KR | 20200036439 A * | 4/2020 |

OTHER PUBLICATIONS

Description Translation for DE 10 2014/214827 from Espacenet (Year: 2016).*
Description Translation for DE 10 2016211213 from Espacenet (Year: 2017).*

* cited by examiner

THREE-POINT SUSPENSION LINK AND PRODUCTION METHOD FOR A THREE-POINT SUSPENSION LINK

CROSS REFERENCE TO RELATED APPLICATIONS

This is a U.S. national stage of application No. PCT/EP2018/069188, filed on Jul. 16, 2018. Priority is claimed on German, Application No.: 10 2017 213 563.8, filed Aug. 4, 2017, the content of which is incorporated herein by reference.

FIELD OF THE INVENTION

The present invention is directed to a three-point suspension link. A production method for a three-point suspension link is also described.

BACKGROUND OF THE INVENTION

Three-point suspension links are used in tractor units in the field of commercial vehicles to link the axle to the structural frame. These three-point suspension links contribute in large measure to the transverse guidance and longitudinal guidance of the axle. A three-point suspension link guides the axle in an upper link plane and influences the driving characteristics of the commercial vehicle. During driving operation of the commercial vehicle, every three-point suspension link is exposed to high longitudinal loads and high transverse loads as well as rolling movements which occur, e.g., during cornering of the commercial vehicle. This imposes special requirements with respect to stiffness of the three-point suspension link.

A multipoint suspension link which is formed substantially from a fiber reinforced plastic composite structure is known from DE102014214827A1. The fiber reinforced plastic composite structure is formed integrally and by bonding connection without a reinforcement structure.

Proceeding from the prior art, it is an object of the present invention to provide an improved three-point suspension link. This three-point suspension link shall be suitable for lightweight construction and shall therefore have a low mass.

SUMMARY OF THE INVENTION

A three-point suspension link for a chassis of a vehicle comprises two load-introducing elements, a central load-introducing element, two core profiles and a supporting winding. The core profiles are formed from a shear-stiff material. The supporting winding is formed from a fiber reinforced plastic composite material. The three-point suspension link has two arms and a central bearing area. The central load-introducing element is arranged at the central bearing area. Each arm is connected to the central bearing area. Each arm has one of the load-introducing elements which is arranged at an end of the corresponding arm opposite the central bearing area. Each arm has a core profile which is spatially arranged between the load-introducing element and the central load-introducing element. The supporting winding surrounds the core profiles and the central load-introducing element in a subarea and is operatively connected to the core profiles, the load-introducing elements and the central load-introducing element. The vehicle is preferably a commercial vehicle but, alternatively, can be a passenger vehicle. "Operatively connected" means that two components are directly connected to one another, this connection being so constituted that forces and moments can be conveyed between the two components.

The two load-introducing elements are formed uniformly with respect to one another. Each load-introducing element may be formed either from a metal material or from a fiber reinforced plastic composite material. For example, every load-introducing element can be formed from aluminum, from a steel, from titanium, or from a long-fiber-reinforced thermoplastic, e.g., SMC (sheet molding compound). The load-introducing elements are preferably produced by an extrusion process with a minimal amount of cutting machining. Every load-introducing element can be formed either of one part or two parts. If the load-introducing element is formed of one part, it is manufactured in one piece which cannot be disassembled into separate parts nondestructively. If the load-introducing element is formed of two parts, it has two individual parts which are formed integral in each instance. For example, the two-part load-introducing element can have two mirror-symmetrical individual parts. Alternatively, the two-part load-introducing element can have two individual parts formed different from one another.

Each load-introducing element has a bearing receptacle which is suitable for receiving a bearing. These bearing receptacles preferably have a circular cross section. The bearing can be a rubber-metal bearing, for example. If the three-point suspension link is used in a chassis of a vehicle, these bearings serve to support the three-point suspension link at a vehicle body, e.g., at a frame structure. The bearing receptacles of the two load-introducing elements have, in each instance, a bearing axis. These bearing axes preferably lie in the same plane. For example, this plane is perpendicular to a central plane of the three-point suspension link and to a bearing axis of the central load-introducing element. The three-point suspension link is preferably formed symmetrical to the central plane. Every load-introducing element is arranged at an arm of the three-point suspension link and limits the latter toward a side opposite the central bearing area. In driving operation, loads act upon these bearings which are operatively connected to the respective load-introducing elements. These loads are conveyed to the load-introducing elements via the receptacles of the load-introducing elements. These loads are conveyed from the load-introducing elements to the supporting winding.

The central load-introducing element has a bearing receptacle which is suitable for receiving a bearing. The bearing can be a rubber-metal bearing, for example. If the three-point suspension link is used in a chassis of a vehicle, this bearing serves to connect the three-point suspension link to an axle body. The bearing receptacle of the central load-introducing element is formed cylindrical, for example. The bearing receptacle of the central load-introducing element has, e.g., a bearing axis which is perpendicular to the plane in which the bearing axes of the two load-introducing elements extend. The bearing axis of the bearing receptacle of the central load-introducing element preferably lies in the central plane of the three-point suspension link. In driving operation, loads act upon the bearing that is connected to the central load-introducing element when the three-point suspension link is used in a vehicle. These loads are received by this bearing and conveyed to the central load-introducing element which in turn introduces the loads into the supporting winding.

Every arm of the three-point suspension link has a core profile. These core profiles are formed from a shear-stiff lightweight material, preferably from a fiber reinforced plastic composite material (FRP) or from a foam material.

The two core profiles are preferably formed from the same material but, alternatively, can be formed from different materials. A glass fiber reinforced plastic (GRP) can be used as FRP, for example. Alternatively, a carbon fiber reinforced plastic (CRP), an aramid fiber reinforced plastic (ARP) or other suitable FRP can be used. A plastic foam or a metal foam, for example, can be used as foam material. The core profiles can be formed, for example, as hollow profiles. The core profiles serve as spacers and make it possible to connect the predominantly unidirectional fiber strands of the supporting winding. The core profiles are preferably produced in a conventional manner by a continuous manufacturing process, e.g., by a pultrusion process. Accordingly, each arm of the three-point suspension link extends from its load-introducing element via the core profile to the central load-introducing element.

The supporting winding is formed from an FRP. The supporting winding is preferably formed from CRP. Alternatively, the supporting winding can be formed from GRP, ARP or from another suitable FRP. The supporting winding is formed of predominantly unidirectional fiber strands which are preferably endless-fiber-reinforced. For example, a sheetlike preimpregnated FRP prepreg material with a duromer matrix can be used to form the supporting winding. Alternatively, a preimpregnated FRP semifinished fiber product with a thermoplastic matrix combined with a short-fiber-reinforced thermoplastic injection molding material can be used.

The supporting winding can be formed of one part or of a plurality of parts. When formed of one part, the supporting winding is formed as a continuous component. When formed as two parts, the supporting winding is formed from two separate components which are, however, formed from the same FRP. When formed of multiple parts, the supporting winding is formed from a plurality of separate components which are, however, formed from the same FRP. In every case, the supporting winding has two load-introducing element-side ends facing the two load-introducing elements, respectively. Further, the supporting winding can have a constant thickness. Alternatively, the supporting winding can have a thickened area or a plurality of thickened areas.

The supporting winding is guided around the central load-introducing element and along the core profiles and is connected to the core profiles and to the central load-introducing element. The central load-introducing element and the core profiles are surrounded in a subarea. The supporting winding contacts the central load-introducing element, which is a geometric extruded body, at a subarea of the outer lateral surface thereof. The supporting winding contacts the core profiles, which are geometric extruded bodies, at a subarea of the outer lateral surface thereof. In other words, the supporting winding forms an outer lateral surface of the three-point suspension link, and the two load-introducing elements are not surrounded by the supporting winding. Each load-introducing element is operatively connected to one of the load-introducing element-side ends of the supporting winding. A load-introducing element-side end is that end of the supporting winding that is operatively connected to the load-introducing element. The supporting winding can be operatively connected to the core profiles and to the central load-introducing element and possibly to the load-introducing elements by an adhesive connection.

If the three-point suspension link is used in a vehicle, loads act upon the bearings which are connected to the load-introducing elements. Loads act on the bearing which is connected to the central load-introducing element. Accordingly, tensile stresses, compressive stresses and bending stresses occur in the three-point suspension link. Due to the construction of the three-point suspension link from multiple materials as described, the reinforcement fibers of the FRP of the supporting winding are optimally oriented in load direction. Due to the manner in which the arms are formed by the core profiles and the supporting winding, the three-point suspension link has a high area moment of inertia so that bending stresses occurring at the arms are reduced. The arms of the three-point suspension link have a high strength. The tensile stresses and compressive stresses are accommodated by the supporting winding.

Because of the construction of the three-point suspension link by a supporting winding of FRP and by core profiles comprising a shear-stiff material, e.g., FRP, or foam material, the three-point suspension link has a lower mass than a conventional three-point suspension link of metal material. Accordingly, the three-point suspension link is a lightweight component. Therefore, when the three-point suspension link is used in a vehicle, the total mass of the vehicle is reduced, which leads to fuel economy and an increase in potential useful load. Further, it is advantageous that the three-point suspension link can be produced in a simple and economical manner by simple production methods. In addition, the three-point suspension link has especially good load-carrying capability.

According to one embodiment form, the load-introducing elements are formed from a metal material. For example, the load-introducing elements can be formed from aluminum, from a steel, from titanium or from another suitable metal material. The load-introducing elements can be produced in an economical and simple manner by an extrusion process with a minimal amount of cutting.

According to a further embodiment form, the load-introducing elements are formed from an FRP. For example, the load-introducing elements can be formed from SMC, i.e., from a long-fiber-reinforced duromer. Carbon fibers, glass fibers, aramid fibers or other suitable fibers can be used as reinforcement fibers. The load-introducing elements can be produced in an economical and simple manner by an extrusion process with a minimal amount of cutting. The use of SMC is advantageous in that the load-introducing elements have a smaller mass than load-introducing elements comprising a metal material. This increases the potential for lightweight construction.

According to a further embodiment form, the central load-introducing element is formed from a metal material. For example, the central load-introducing element can be formed from aluminum, from a steel, from titanium or from another suitable metal material. The central load-introducing element can be produced in an economical and simple manner by an extrusion process with a minimal amount of cutting.

According to a further embodiment form, the central load-introducing element is formed from an FRP. For example, the central load-introducing element can be formed from SMC, i.e., from a long-fiber-reinforced duromer. Carbon fibers, glass fibers, aramid fibers or other suitable fibers can be used as reinforcement fibers. The central load-introducing element can be produced in an economical and simple manner by an extrusion process with a minimal amount of cutting. The use of SMC is advantageous in that the central load-introducing element has a smaller mass than central load-introducing elements comprising a metal material. This increases the potential for lightweight construction.

According to a further embodiment form, each load-introducing element has a receptacle which receives a load-introducing element-side end of the supporting winding. Each receptacle is formed in such a way that it is an exact fit for the end of the supporting winding on the load-introducing element side. That is, the shaping of the receptacles is oriented to the shaping of the load-introducing element-side ends of the supporting winding. Each receptacle can be formed, for example, as a straight groove, as a plurality of straight grooves, in an arcuate manner, a rectangular manner or in another suitable shape. It will be appreciated that these receptacles may also be formed of two or more parts. This is the case, for example, when the supporting winding is not connected at its load-introducing element-side ends but rather has two end portions. In this case, the receptacle is formed as two grooves. The receptacle can have a constant width, for example.

Each load-introducing element-side end of the supporting winding is inserted into its corresponding receptacle and accordingly received by the latter. A first load-introducing element-side end of the supporting winding is inserted into a first receptacle and received by the latter. Accordingly, the first load-introducing element-side end of the supporting winding is operatively connected to the first load-introducing element. A second load-introducing element-side end of the supporting winding is inserted into a second receptacle and received by the latter. Accordingly, the second load-introducing element-side end of the supporting winding is operatively connected to the second load-introducing element.

According to a further embodiment form, the at least one receptacle of each load-introducing element is formed to be arcuate, and each load-introducing element-side end of the supporting winding is formed as a loop, the receptacle of each load-introducing element being connected by positive engagement to its corresponding load-introducing element-side end of the supporting winding. The receptacles are formed to exactly fit the loop shape of the load-introducing element-side ends of the supporting winding. Each load-introducing element-side end of the supporting winding forms a loop and the supporting winding is accordingly formed of one part. In other words, the supporting winding forms a continuous winding. During a production process for producing the three-point suspension link, placeholders are used to realize the loop shape of the load-introducing element-side ends of the supporting winding.

This is advantageous in that a positive engagement is formed between the supporting winding and the load-introducing elements so that the transmission of force between the load-introducing elements and the supporting winding is improved.

According to a further embodiment form, each load-introducing element is operatively connected to the supporting winding by bonding by an adhesive connection. That is, a bonding connection formed by an adhesive connection exists between the first load-introducing element-side end of the supporting winding and the first receptacle. Further, a bonding connection formed by an adhesive connection exists between the second load-introducing element-side end of the supporting winding and the second receptacle. The receptacle of each load-introducing element accordingly receives the respective load-introducing element-side end of the supporting winding and an adhesive layer.

For example, each receptacle can be filled with adhesive so that the load-introducing element-side end of the supporting winding is completely wetted with adhesive. As a result of the adhesive connection, a force transmission between the respective load-introducing element and the supporting winding is improved when the three-point suspension link is used in a vehicle and a load event occurs. Further, this has positive effects on the durability of the three-point suspension link, since this prevents movements of the load-introducing element-side end inside of its corresponding receptacles.

According to a further embodiment form, each arm has a cutout spatially between its core profile and its load-introducing element. These cutouts are material-free gaps. In other words, the load-introducing elements do not contact the core profiles. A first cutout is arranged between the first load-introducing element and the core profile of the first arm. A second cutout is arranged between the second load-introducing element and the core profile of the second arm.

Because of the cutouts, the load-introducing elements are decoupled from the core profiles. If the three-point suspension link is used in a vehicle and a load event occurs, the occurring forces are introduced into the load-introducing elements. The load-introducing elements conduct the forces further to the supporting winding and not directly into the core profiles. Accordingly, the accommodation of forces of the three-point suspension link in a load event is improved.

According to a further embodiment form, each arm has a cutout spatially between its core profile and the central load-introducing element. These cutouts are material-free gaps. In other words, the core profiles do not contact the central load-introducing element. A third cutout is arranged between the core profile of the first arm and the central load-introducing element. A fourth cutout is arranged between the core profile of the second arm and the central load-introducing element.

Because of the cutouts, the central load-introducing element is decoupled from the core profiles. If the three-point suspension link is used in a vehicle and a load event occurs, the occurring forces are introduced into the central load-introducing element. The central load-introducing element conveys the forces further to the supporting winding and not directly into the core profiles. Accordingly, the accommodation of forces of the three-point suspension link in a load event is improved.

According to a further embodiment form, the supporting winding is formed to be thickened at the area in which it contacts the central load-introducing element. That is, the fiber layers of the supporting winding are locally thickened, i.e., reinforced, in the area of the central load-introducing element. The supporting winding is connected to the central load-introducing element by an adhesive connection. This adhesive connection is planar. This adhesive connection serves to pass on the loads between the fiber strands and to remove the loads occurring at the central load-introducing element when the three-point suspension link is used in a vehicle and a load event occurs.

According to a further embodiment form, at least one load-introducing element of the two load-introducing elements is formed of two parts. For example, the two-part load-introducing element can have two mirror-symmetrical individual parts. Alternatively, the two-part load-introducing elements can have two individual parts which are formed different from one another. The two individual parts are preferably connected to one another by a bonding connection, e.g., by an adhesive connection. Alternatively or additionally, the individual parts can be connected to one another by a positive engagement, e.g., by a plug-in connection. This is advantageous in that it facilitates production during a process for producing the three-point suspension link because the supporting winding is initially connected to a first individual part of the load-introducing element and subsequently to a second individual part of the load-introducing element.

According to a further embodiment form, the shear-stiff material of the core profiles is a fiber reinforced plastic composite material or a foam material. The shear-stiff material is a lightweight material. The shear-stiff material is preferably an FRP or a foam material. A GRP, a CRP, an ARP or another suitable FRP can be used as FRP, for example. A plastic foam or a metal foam can be used, for example, as foam material. This plastic foam material can be, for example, a foamed polyurethane, polypropylene, polycarbonate or other suitable plastic. The metal foam material can be, for example, foamed aluminum, a bismuth-based metal alloy or another suitable metal material.

In a method for producing a three-point suspension link for a chassis of a vehicle as has already been described in the preceding description, the central load-introducing element and the core profiles are first inserted into a mold. They are fixed in position in the mold. It will be understood that the core profiles and the central load-introducing element are cleaned prior to insertion in the mold. The supporting winding is subsequently set down at the central load-introducing element and the core profiles and operatively connected to the latter by an adhesive connection. After this, the supporting winding is cured. The supporting winding is then operatively connected to the two load-introducing elements by a bonding connection and/or positive engagement connection. It will be understood that the load-introducing elements are cleaned prior to use. In case of a bonding connection, this bonding connection is additionally cured. Lastly, the three-point suspension link is removed from the mold. In order to use the three-point suspension link in a vehicle, bearings are inserted into the bearing receptacles of the load-introducing elements and of the central load-introducing element, e.g., they are pressed in or glued in by a clearance fit.

BRIEF DESCRIPTION OF THE DRAWINGS

Various embodiment examples and details of the invention will be described more fully with reference to the drawings in which.

DETAILED DESCRIPTION OF THE PRESENTLY PREFERRED EMBODIMENTS

Figure 1:
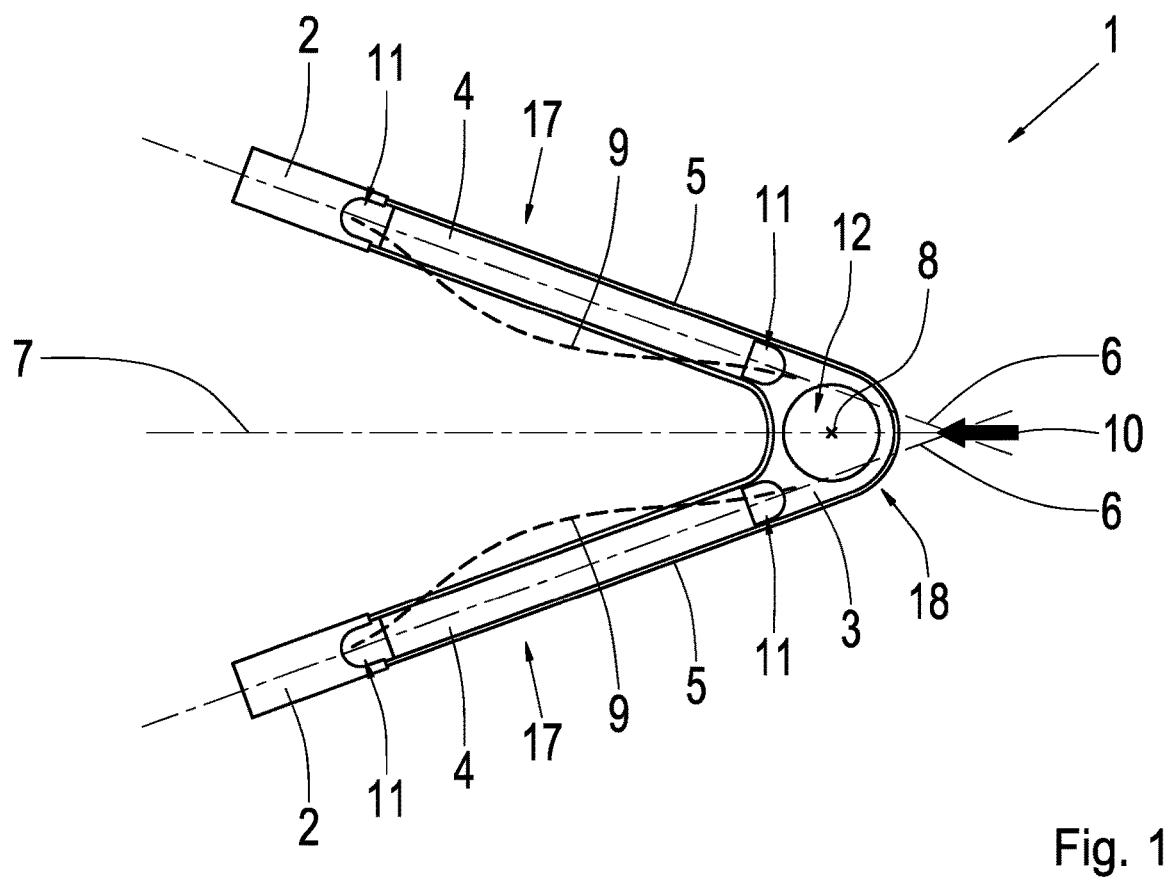
FIG. 1 is a schematic top view of a three-point suspension link according to an embodiment example of the present invention.

FIG. 1 shows a schematic top view of a three-point suspension link 1 according to an embodiment example. The three-point suspension link 1 has two load-introducing elements 2, a central load-introducing element 3, two core profiles 4 and a supporting winding 5. The three-point suspension link 1 is formed of two arms 17 and a central bearing area 18. Each arm has a load-introducing element 2 and a core profile 4. The central bearing area 18 is formed by the central load-introducing element 3. Each arm 17 extends from the load-introducing element 2 thereof via the core profile 4 thereof to the central load-introducing element 3. Each arm 17 has a longitudinal axis 6. This longitudinal axis 6 of an arm 17 likewise extends from the load-introducing element 2 of arm 17 via core profile 4 of the same arm 17 to the central load-introducing element 3. The three-point suspension link 1 is formed symmetric to a central plane in which a central axis 7 is arranged. This central axis 7 has the same distance from every longitudinal axis 6. Further, the central axis 7 is perpendicular to a bearing axis 8 of the central load-introducing element 3.

The central load-introducing element 3 has a bearing receptacle 12 which is suitable for receiving a central bearing. The two load-introducing elements 2 likewise have, respectively, a bearing receptacle 12, although this is not visible in the present diagram. The bearing axis 8 of the central load-introducing element 3 is formed perpendicular to a plane in which the two bearing axes of the two load-introducing elements 2, not shown, are arranged. This plane is likewise perpendicular to the central plane of the three-point suspension link 1 in which the central axis 7 is located. This bearing axis 8 lies inside of the central plane of the three-point suspension link 1 in which the central axis 7 is also located.

The supporting winding 5 forms an outer lateral surface of the three-point suspension link 1. The supporting winding 5 is formed of two parts. Supporting winding 5 contacts the central load-introducing element 3 and the two core profiles 4 in a subarea and surrounds the latter in the same subarea. Supporting winding 5 likewise contacts the two load-introducing elements 2 but does not surround them. Supporting winding 5 has two load-introducing element-side ends which are received by a receptacle of the load-introducing elements 2 in each instance. Each load-introducing element 2 accordingly has a receptacle, although this is not shown here.

A first load-introducing element-side end of supporting winding 5 is inserted into a receptacle of the first load-introducing element 2 and operatively connected to this first load-introducing element 2. A second load-introducing element-side end of the supporting winding 5 is inserted into a receptacle of the second load-introducing element 2 and operatively connected to the latter. The exact shape of these receptacles is shown more clearly in FIG. 3. The operative connection between the supporting winding 5 and the two load-introducing elements 2 is produced by an adhesive connection. Supporting winding 5 is likewise glued to the two core profiles 4 and the central load-introducing element 3.

A material-free cutout 11 is arranged between the load-introducing element 2 of the first arm 17 and the core profile 4 of the first arm 17. A material-free cutout 11 is arranged between the load-introducing element 2 of the second arm 17 and the core profile 4 of the second arm 17. The two core profiles 4 are accordingly decoupled from the two load-introducing elements 2. A material-free cut out or gap 11 is arranged between the central load-introducing element 3 and the core profile 4 of the first arm 17. A material-free cutout 11 is arranged between the central load-introducing element 3 and the core profile 4 of the second arm 17. Accordingly, the central load-introducing element 3 is decoupled from the two core profiles 4.

If the three-point suspension link 1 is used in a vehicle, a longitudinal load 10 occurs at the central bearing area 18. This is indicated by an arrow. Due to this longitudinal load 10, a deformation of the two arms 17 is brought about, which is depicted in an exaggerated manner by the two bending lines 9. Due to the fact that the two core profiles 4 are decoupled from the two load-introducing elements 2 and the central load-introducing element 3, a transmission of force in a load event is carried out from the load-introducing elements 2 or from the central load-introducing element 3 into the supporting winding 5 and not directly into the core profile 4 or core profiles 4. Accordingly, the accommodation of force by the three-point suspension link 1 is facilitated.

The two core profiles 4 are formed from an FRP, more exactly from a GRP. Supporting winding 5 is formed from predominately unidirectional fiber strands, e.g., from CRP or GRP. The two load-introducing elements 2 and the central load-introducing element 3 are formed from aluminum. As result of this construction from multiple materials, the three-point suspension link 1 has an increased potential to be lightweight. In addition, the three-point suspension link 1 is especially capable of carrying loads and satisfies the given kinematic requirements. The three-point suspension link 1 has a smaller mass than a conventional three-point suspension link of the prior art that is formed completely from a metal material.

Figure 2:
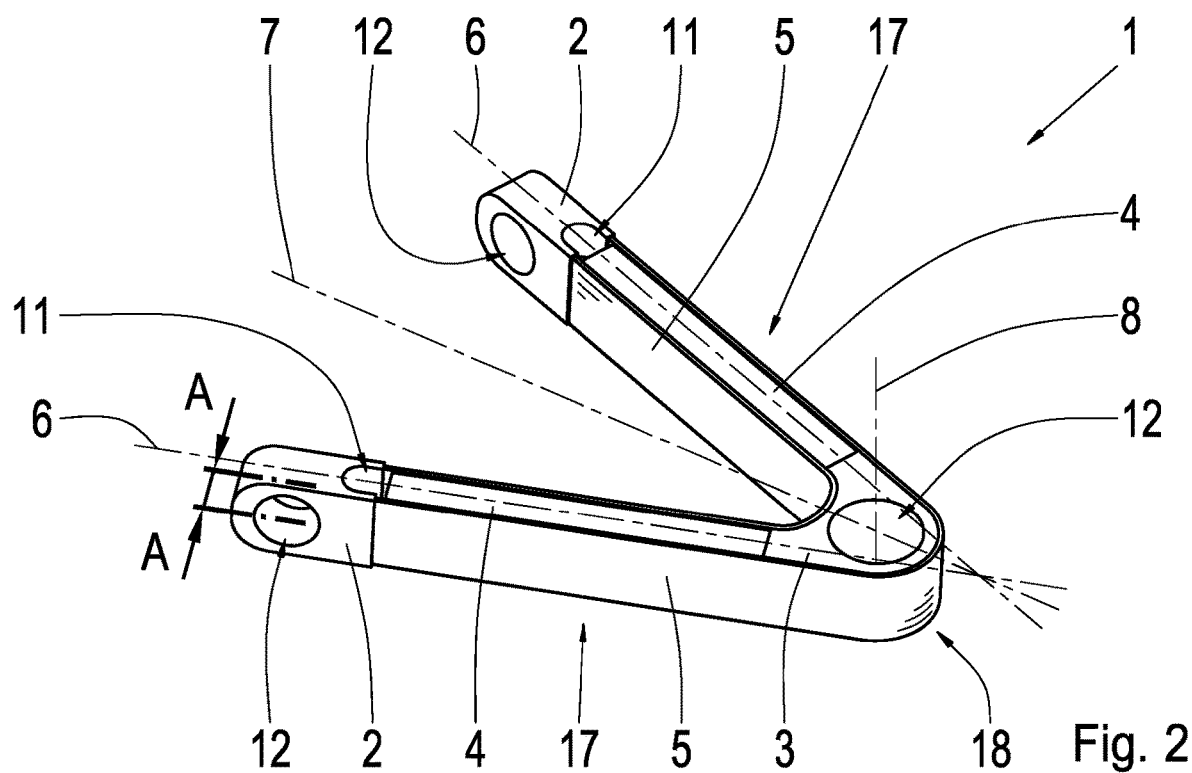
FIG. 2 is a schematic side view of the three-point suspension link according to the embodiment example from FIG. 1.

FIG. 2 shows a schematic side view of the three-point suspension link 1 according to the embodiment example from FIG. 1. The bearing receptacles 12 of the two load-introducing elements 2 are clearly shown. The bearing axes of these bearing receptacles 12 lie in a plane that is perpendicular to the bearing axis 8 of the central load-introducing element 3. Further, it is clearly shown that the two load-introducing elements 2 receive the load-introducing element-side ends of the supporting winding 5 by the receptacles thereof. The drawing also shows a section plane A-A.

Figure 3:
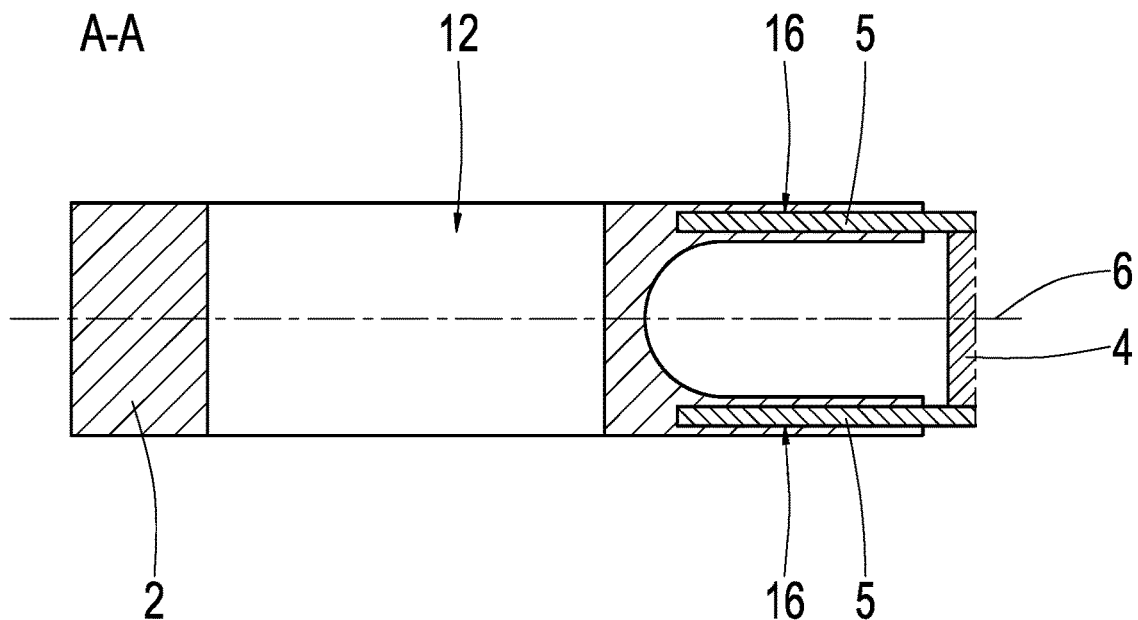
FIG. 3 is a schematic sectional view along section plane A-A of the load-introducing element of the three-point suspension link according to the embodiment example from FIG. 1 and FIG. 2.

FIG. 3 shows a schematic sectional view along section plane A-A of the load-introducing element 2 of the three-point suspension link 1 according to the embodiment example from FIG. 1 and FIG. 2. A subarea of the core profile 4 and the longitudinal axis 6 are shown to facilitate orientation.

The load-introducing element 2 has bearing receptacle 12. Further, the load-introducing element 2 has a receptacle 16 for the load-introducing element-side end of the supporting winding 5. This receptacle 16 is formed of two parts. Receptacle 16 is in the form of two straight grooves. The latter are an exact fit for the load-introducing element-side end of the supporting winding 5 so that a positive engagement connection is provided. The load-introducing element-side ends of the supporting winding 5 are bondingly connected to receptacle 16 of the load-introducing element by an adhesive connection. The adhesive connection serves to produce an operative connection between the load-introducing element 2 and the supporting winding 5.

Figure 4:
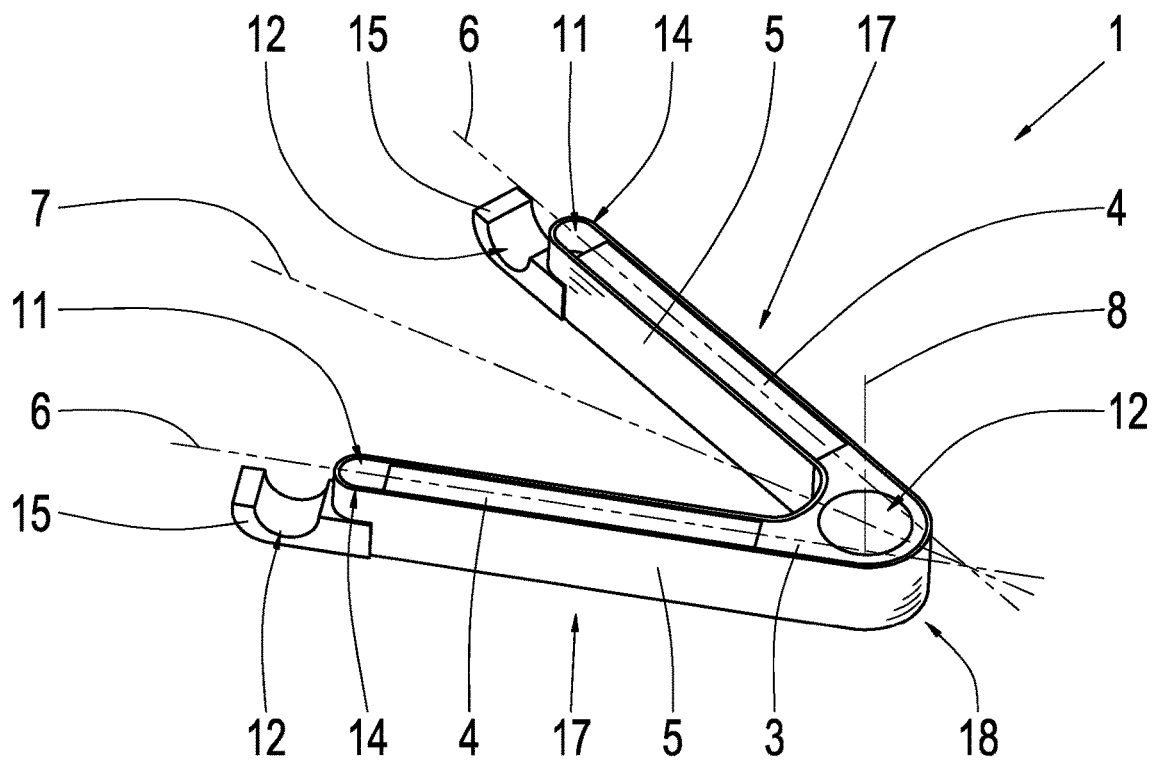
FIG. 4 is a schematic side view of a three-point suspension link according to a further embodiment example.

FIG. 4 shows a schematic side view of a three-point suspension link 1 according to a further embodiment example. The three-point suspension link 1 in this instance has two arms 17 and a central bearing area 18 like the three-point suspension link from FIG. 1 and FIG. 2. The central bearing area 18 is formed by the central load-introducing element 3. Each arm 17 has a core profile 4 and a load-introducing element 15. A first arm 17 extends from a first load-introducing element 15 via a first core profile to the central load-introducing element 3. A second arm 17 extends from a second load-introducing element 15 via a second core profile 4 to the central load-introducing element 3. A supporting winding 5 surrounds the two core profiles 4 and the central load-introducing element 3 in a subarea and contacts the latter in this subarea. Further, the supporting winding 5 contacts the two load-introducing elements 15 but does not surround them. Supporting winding 5 accordingly forms an outer lateral surface of the three-point suspension link 1.

The central load-introducing element 3 is formed as in FIG. 1 and FIG. 2. Central load-introducing element 3 has a bearing receptacle 12. This bearing receptacle 12 has a bearing axis 8. This bearing axis 8 lies within a central plane of the three-point suspension link 1 in which the central axis 7 is also located. Bearing axis 8 is perpendicular to central axis 7. Each arm 17 has a longitudinal axis 6 which extends from the load-introducing element 15 via the core profile 4 to the central load-introducing element 3. The central axis 7 has the same distance from both longitudinal axes 6.

In contrast to the load-introducing elements from FIGS. 1 to 3, the two load-introducing elements 15 are formed of two parts. For the sake of clarity, only a portion of the two load-introducing elements 15 is shown. The two individual parts of each load-introducing element 15 are formed mirror-symmetrically to one another. If the two individual parts of the load-introducing elements 15 are joined together, they have the same outer shape as the load-introducing elements from FIGS. 1 to 3. Each load-introducing element 15 has a bearing receptacle 12. This bearing receptacle 12 has a bearing axis, and the two bearing axes of the two load-introducing elements 15 are arranged in the same plane. This plane is perpendicular to the bearing axis 8 of the central load-introducing element 3.

It can be clearly discerned in the present instance that the receptacle 16 of each load-introducing element 5 is formed as an arc. These receptacles 16 exactly fit the loops 14 of the supporting winding 5. The two load-introducing element-side ends of the supporting winding 5 are formed as loop 14. Each loop 14 is operatively connected to its corresponding load-introducing element 15, this operative connection being a positive engagement. Further, the two loops 14 are operatively connected to the two load-introducing elements 15 by bonding by an adhesive connection.

It will further be discerned that a material-free cutout 11 or space is arranged between each load-introducing element 15 and each core profile 4 of the three-point suspension link 1. The first load-introducing element 15 is accordingly decoupled from the first core profile 4. The second load-introducing element 15 is likewise decoupled from the second core profile 4. If the three-point suspension link 1 is used in a vehicle and a load event occurs, forces are introduced, for example, into the two load-introducing elements 15. Load-introducing elements 15 conduct these forces to the supporting winding 5 and not directly to the core profile 4. The supporting winding 5 receives these forces.

Each core profile 4 is formed from an FRP, more exactly from GRP. Supporting winding 5 is formed from an FRP, namely, from CRP or GRP. The two load-introducing elements 15 and the central load-introducing element 3 are formed from SMC. Accordingly, the depicted three-point suspension link 1 has an increased potential for lightweight construction and has a smaller mass than a conventional three-point suspension link comprising a metal material. Forming the two load-introducing element-side ends of the supporting winding 5 as loop 14 has a positive effect on the durability of the three-point suspension link 1.

Figure 5:
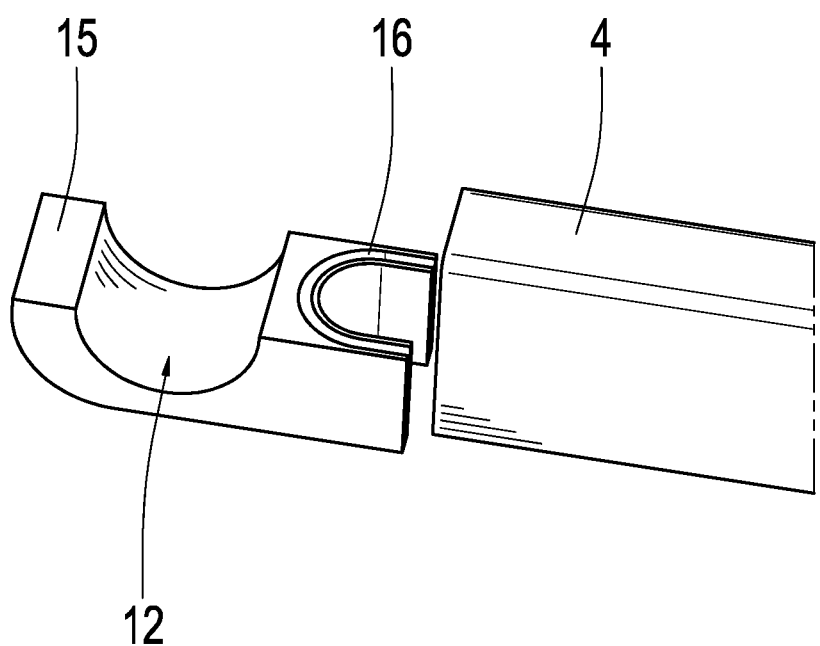
FIG. 5 is a schematic detailed view of a load-introducing element and core profile of the three-point suspension link according to the embodiment example from FIG. 4.

FIG. 5 shows a schematic detailed diagram of a load-introducing element 15 and a core profile 4 of the three-point suspension link 1 according to the embodiment example from FIG. 4. It can be clearly discerned that the receptacle 16 is formed arcuate to receive the loop of the supporting winding of the three-point suspension link 1. Further, the material-free cutout 11 between the load-introducing element 15 and the core profile 4 are clearly shown. These two components are accordingly not coupled to one another.

The examples shown here are selected to be exemplary only. For example, the load-introducing elements and the central load-introducing element from FIGS. 1 to 3 can be formed from an FRP, e.g., from SMC. For example, the load-introducing elements and the central load-introducing element from FIGS. 4 to 5 are formed from a metal material, e.g., from aluminum.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A three-point suspension link for a chassis of a vehicle, comprising:
two load-introducing elements;
a central load-introducing element, two core profiles and a supporting winding, two arms and a central bearing area;
said central load-introducing element arranged at said central bearing area, said two core profiles formed from a shear-stiff material, said three-point suspension link being arranged so that the two arms and the central bearing area are symmetrical to a central plane having therein a central axis of the three-point suspension link, wherein the central load-introducing element has a central bearing receptacle having a bearing axis, the bearing axis of the central bearing receptacle being perpendicular to the central axis of the three-point suspension link;
said supporting winding formed from a fiber reinforced plastic composite material;
said three-point suspension link further comprising:
two arms each of said two arms connected to said central bearing area and having one of said two load-introducing elements arranged at an end of a respective one of said two arms opposite said central bearing area;
each of said arms further having one of said two core profiles spatially arranged between said load-introducing elements and said central load-introducing element;
said supporting winding surrounding said core profiles and said central load-introducing element in a subarea and being operatively connected to said core profiles, said load-introducing elements and said central load-introducing element,
wherein each load-introducing element has a receptacle which receives a load-introducing element-side end of said supporting winding, and
wherein said receptacle of each said load-introducing element is formed to be arcuate, and each load-introducing element-side end of said supporting winding is formed as a loop that completely loops around and surrounds the core profiles, wherein said loop contacts, but does not surround, the receptacle of each load-introducing element.

2. The three-point suspension link according to claim 1, wherein said load-introducing elements are formed from a metal material.

3. The three-point suspension link according to claim 1, wherein said load-introducing elements are formed from a fiber reinforced plastic composite material.

4. The three-point suspension link according to claim 1, wherein said central load-introducing element is formed from a metal material.

5. The three-point suspension link according to claim 1, wherein said central load-introducing element (3) is formed from a fiber reinforced plastic composite material.

6. The three-point suspension link according to claim 1, wherein said at least one receptacle of each load-introducing element is connected by positive engagement to a corresponding load-introducing element-side end of said supporting winding.

7. The three-point suspension link according to claim 1, wherein each said load-introducing element is operatively connected to said supporting winding by bonding by an adhesive connection.

8. The three-point suspension link according to claim 1, wherein each said arm has a cutout spatially between a respective one of said core profiles and said load-introducing element.

9. The three-point suspension link according to claim 1, wherein each said arm has a cutout spatially between a respective one of said core profiles and said central load-introducing element.

10. The three-point suspension link according to claim 1, wherein said supporting winding is formed to be thickened at an area in which said supporting winding contacts said central load-introducing element.

11. The three-point suspension link according to claim 1, wherein said at least one load-introducing element is formed of two parts.

12. The three-point suspension link according to claim 1, wherein said shear-stiff material of said core profiles is a fiber reinforced plastic composite material or a foam material.

13. A method for producing a three-point suspension link having two load-introducing elements; a central load-introducing element, two core profiles and a supporting winding, two arms and a central bearing area; said central load-introducing element arranged at said central bearing area; said two core profiles formed from a shear-stiff material, said three-point suspension link being arranged so that the two arms and the central bearing area are symmetrical to a central plane having therein a central axis of the three-point suspension link, wherein the central load-introducing element has a central bearing receptacle having a bearing axis, the bearing axis of the central bearing receptacle being perpendicular to the central axis of the three-point suspension link; said supporting winding formed from a fiber reinforced plastic composite material; said three-point suspension link further comprising two arms, each of said two arms connected to said central bearing area and having one of said two load-introducing elements arranged at an end of a respective one of said two arms opposite said central bearing area; each of said arms further having one of said two core profiles spatially arranged between the load-introducing elements and said central load-introducing element; said supporting winding surrounding said core profiles and said central load-introducing element in a subarea and being operatively connected to said core profiles, said load-introducing elements and said central load-introducing element, wherein each load-introducing element has a receptacle which receives a load-introducing element-side end of said supporting winding, and wherein said receptacle of each said load-introducing element is formed to be arcuate, and each load-introducing element-side end of said supporting winding is formed as a loop that completely loops around and surrounds the core profiles, wherein said loop contacts, but does not surround, the receptacle of each load-introducing element;

said method comprising:
inserting said central load-introducing element and said core profiles into a mold;
setting down said supporting winding at said central load-introducing element and said core profiles;
operatively connecting said supporting winding with said core profiles by an adhesive connection;
curing said supporting winding;
operatively connecting said supporting winding with said central load-introducing elements by a bonding connection and/or positive engagement connection; and
removing said three-point suspension link from the mold.

* * * * *